United States Patent
Yang

(10) Patent No.: US 11,526,702 B2
(45) Date of Patent: Dec. 13, 2022

(54) UNSUPERVISED MULTI-SCALE DISPARITY/OPTICAL FLOW FUSION

(71) Applicant: Ambarella International LP, Santa Clara, CA (US)

(72) Inventor: Zhikan Yang, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 239 days.

(21) Appl. No.: 16/951,257

(22) Filed: Nov. 18, 2020

(65) Prior Publication Data

US 2022/0147776 A1 May 12, 2022

(30) Foreign Application Priority Data

Nov. 12, 2020 (CN) .......................... 202011259710.8

(51) Int. Cl.
*G06V 10/00* (2022.01)
*G06K 9/62* (2022.01)
*G06T 7/285* (2017.01)
*G06T 7/593* (2017.01)
*G06N 3/04* (2006.01)
*G06N 3/08* (2006.01)
(Continued)

(52) U.S. Cl.
CPC ......... *G06K 9/6265* (2013.01); *G06K 9/6256* (2013.01); *G06K 9/6259* (2013.01); *G06K 9/6268* (2013.01); *G06N 3/0454* (2013.01); *G06N 3/088* (2013.01); *G06T 7/285* (2017.01); *G06T 7/593* (2017.01); *G06V 10/462* (2022.01); *G06V 10/88* (2022.01); *G06T 2207/10021* (2013.01); *G06T 2207/20081* (2013.01); *G06T 2207/20084* (2013.01)

(58) Field of Classification Search
CPC ...... G06V 10/40; G06V 10/42; G06V 10/421; G06V 10/422; G06V 10/462; G06N 3/088; G06N 3/0454; G06K 9/6265; G06K 9/6259; G06K 9/4671; G06K 9/82; G06K 9/6268; G06K 9/6256; G06T 7/285; G06T 7/593; G06T 2207/20081; G06T 2207/20084
See application file for complete search history.

(56) References Cited

U.S. PATENT DOCUMENTS 9,532,036 B2 * 12/2016 Kim .......................... G06T 7/85
10,380,753 B1 * 8/2019 Csordás ................. G06V 10/82
(Continued)

*Primary Examiner* — Amir Alavi
(74) *Attorney, Agent, or Firm* — Christopher P. Maiorana, PC

(57) ABSTRACT

An apparatus includes an interface and a processor. The interface may be configured to receive images from a capture device. The processor may be configured to (i) extract features from the images, (ii) generate fused disparity maps in response to the features extracted, (iii) generate regenerated images by performing warping on a first subset of the images based on (a) the fused disparity maps and (b) first parameters, (iv) perform a comparison of a sample image to one of the first subset of the images, (v) perform a classification of the sample image based on second parameters, and (vi) update the first parameters and the second parameters in response to whether the classification is correct, wherein (a) the classification comprises indicating whether the sample image is one of a second subset of the images or one of the regenerated images and (b) the regenerated images are used as a training dataset.

15 Claims, 13 Drawing Sheets

(51) Int. Cl.
     *G06V 10/88*         (2022.01)
     *G06V 10/46*         (2022.01)

(56) References Cited

U.S. PATENT DOCUMENTS

| | | | | |
|---|---|---|---|---|
| 10,547,823 | B2* | 1/2020 | Chaudhuri | H04N 13/271 |
| 11,062,471 | B1* | 7/2021 | Zhong | G06T 7/593 |
| 11,080,590 | B2* | 8/2021 | Smolyanskiy | G06T 1/20 |
| 11,093,886 | B2* | 8/2021 | Bhatt | G06N 20/00 |
| 11,158,077 | B2* | 10/2021 | Fang | G06T 3/40 |
| 11,259,005 | B1* | 2/2022 | Garcia Freitas | H04N 13/232 |
| 11,308,576 | B2* | 4/2022 | Yuan | G06T 3/0012 |
| 2021/0065379 | A1* | 3/2021 | Zhang | G06T 5/002 |
| 2022/0147776 | A1* | 5/2022 | Yang | G06V 10/88 |

\* cited by examiner

UNSUPERVISED MULTI-SCALE DISPARITY/OPTICAL FLOW FUSION

This application relates to Chinese Application No. 202011259710.8, filed Nov. 12, 2020, which is incorporated by reference in its entirety.

FIELD OF THE INVENTION

The invention relates to sensor fusion generally and, more particularly, to a method and/or apparatus for implementing unsupervised multi-scale disparity/optical flow fusion.

BACKGROUND

In dual camera stereo reconstruction, accuracy and density of a disparity/optical flow map are critical to a high level algorithm. When disparity is calculated in high resolution images only, the calculation can suffer from noise and a dense disparity/optical flow map cannot be obtained. When disparity is calculated in low resolution images only, denser but less accurate disparity is obtained. Typically, disparity is calculated in both high and low resolution images and the results merged together.

However, manually designing a proper fusion algorithm is challenging. A normal convolutional neural network (CNN) requires ground truth disparity to train the network. However, such ground truth disparity for a training dataset is not easy to gather.

It would be desirable to implement unsupervised multi-scale disparity/optical flow fusion.

SUMMARY

The invention encompasses an aspect concerning an apparatus comprising an interface and a processor. The interface may be configured to receive images from a capture device. The processor may be configured to (i) extract features from the images, (ii) generate fused disparity maps in response to the features extracted, (iii) generate regenerated images by performing warping on a first subset of the images based on (a) the fused disparity maps and (b) first parameters, (iv) perform a comparison of a sample image to one of the first subset of the images, (v) perform a classification of the sample image based on second parameters, and (vi) update the first parameters and the second parameters in response to whether the classification is correct, wherein (a) the classification comprises indicating whether the sample image is one of a second subset of the images or one of the regenerated images and (b) the regenerated images are used as a training dataset.

In some embodiments of the apparatus aspect described above, (i) the capture device comprises a first camera and a second camera configured as a stereo camera, (ii) the first subset of the images may be captured by the first camera, and (iii) the second subset of the images may be captured by the second camera. In embodiments implementing a stereo camera, (i) the first subset of the images comprises left images, (ii) the second subset of the images comprises right images, and (iii) the training dataset comprises data for disparity calculations.

In some embodiments of the apparatus aspect described above, (i) the first subset of the images comprises the images captured at an earlier time in a sequence of the images, (ii) the second subset of the images comprises the images captured at a later time in the sequence of the images compared to the first subset of the images and (iii) the training dataset comprises optical flow information.

In some embodiments of the apparatus aspect described above, the sample image is randomly selected from the second subset of the images or the regenerated images. In some embodiments where the sample image is randomly selected, (a) the first parameters are updated to adjust the regenerated images to result in a decrease of a probability that the classification of the sample image is correct and (b) the second parameters are updated to increase the probability that the classification of the sample image is correct. In some embodiments where the sample image is randomly selected, the regenerated images are used as the training dataset when the probability is greater than a threshold amount. In some embodiments where the regenerated images are used as the training dataset when the probability is greater than a threshold amount, the threshold amount may be approximately 50%.

In some embodiments of the apparatus aspect described above, the processor is configured to implement (i) a first neural network to implement a first model based on the first parameters and (ii) a second neural network to implement a second model based on the second parameters. In embodiments implementing a first neural network and a second neural network, (i) the first neural network may be configured to (a) extract the features from the first subset of the images and the second subset of the images, (b) generate the fused disparity maps in response to the features extracted, and (c) generate the regenerated images, and (ii) the second neural network may be configured to perform (a) the comparison of the sample image to one of the first subset of the images and (b) the classification of the sample image based on the second parameters. In some embodiments implementing a first neural network and a second neural network, (i) the first neural network generally implements a generative neural network model and (ii) the second neural network generally implements a discriminative neural network model. In embodiments implementing a generative neural network model and a discriminative neural network model, the generative neural network model and the discriminative neural network model may be configured as an unsupervised generative adversarial network. In some embodiments implementing the generative neural network model and the discriminative neural network model, the processor may be configured to operate using the generative neural network model and the discriminative neural network model to generate the training dataset in a training mode of operation. In some embodiments, the processor is further configured to operate using the generative neural network model and disable the discriminative neural network model in a data generation mode of operation. In some embodiments using the generative neural network model and disable the discriminative neural network model in a data generation mode of operation, the processor operates in the data generation mode of operation after the generative neural network model has been sufficiently trained during the training mode of operation.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing unsupervised multi-scale disparity/optical flow fusion that may (i) utilize a new generative adversarial network (GAN) based algorithm, (ii) create a stereo pair of images from a single image, (iii) predict motion of an object in an image, (iv) avoid need for ground truth dataset, (v) improve density and accuracy of disparity map and optical flow map calculations, and/or (vi) be implemented as one or more integrated circuits.

In various embodiments, a new generative adversarial network (GAN) based algorithm may be implemented to perform unsupervised multi-scale disparity/optical flow fusion. Optical flow and stereo disparity are two fundamental and related ways of analyzing images in a computer vision system. Optical flow measures an apparent motion of points between two images, while stereo disparity measures a depth of objects relative to two cameras. In general, optical flow measures motion over time, while stereo disparity measures displacement at one point in time. Optical flow and stereo disparity are generally used in computer vision tasks including, but not limited to, automotive and robotic navigation, and video analytics.

Figure 1:
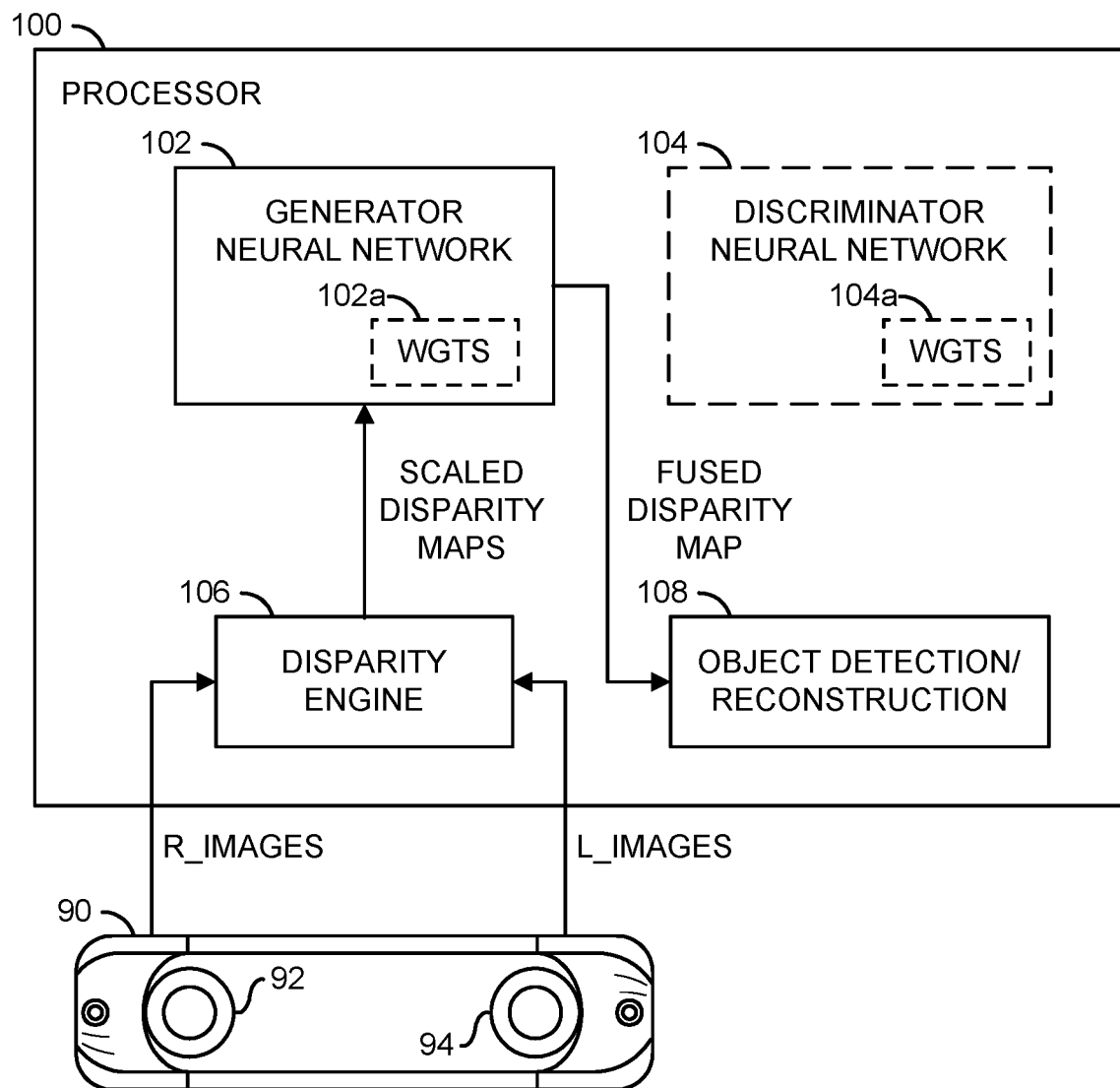
FIG. 1 is a diagram illustrating a processor in accordance with an example embodiment of the invention in a context of a stereo camera application.

Referring to FIG. 1, a diagram is shown illustrating a processor in accordance with an example embodiment of the invention in a context of a stereo camera application. In an example, a circuit 100 may implement a processor in accordance with an example embodiment of the invention. In an example, the circuit 100 may be configured to received images from a camera assembly 90. In an example, the circuit 100 may receive a first signal (e.g., R_IMAGES) and a second signal (e.g., L_IMAGES) from the camera assembly 90. The signal R_IMAGES may communicate a first subset of images from the camera assembly 90 to the circuit 100. The signal L_IMAGES may communicate a second subset of images from the camera assembly 90 to the circuit 100. In an example where the camera 90 is configured as a stereo camera, the signals R_IMAGES and L_IMAGES may comprise corresponding right and left images, respectively, captured by the camera assembly 90.

In an example, the camera assembly 90 may comprise a first camera 92 and a second camera 94. In an example embodiment, the first camera 92 and the second camera 94 may be configured as a stereo camera pair. For example, the first camera 92 and the second camera 94 may be mounted such that an optical axis of the first camera 92 and an optical axis of the second camera 94 are at a predetermined angle to each another.

In various embodiments, the circuit 100 may be configured to calculate disparity values between corresponding images of the signal R_IMAGES and the signal L_IMAGES. In an example, the disparity values may be utilized for object detection and/or reconstruction. In another example, the disparity values may be utilized for object tracking, depth measurement, object speed and/or motion determination, etc. In general, disparity comprises depth information that may be utilized in any application needing three-dimensional (3D) information (e.g., 3D reconstruction).

In an example embodiment, the circuit 100 may comprise a block (or circuit) 102, a block (or circuit) 104, a block (or circuit) 106, and a block (or circuit) 108. The blocks 102 and 104 may be implemented using artificial neural networks (ANNs). In an example embodiment, the blocks 102 and 104 may be implemented as convolutional neural networks (CNNs) or deep convolutional neural networks (DCNNs). In an example, each of the neural networks of the blocks 102 and 104 may be implemented using a directed acyclic graph (DAG) and a corresponding set of weights 102a and 104a. In an example embodiment, the DAGs may be executed using hardware engines of the processor 100. In an example, the corresponding sets of weights 102a and 104a may be determined using an unsupervised training process described below in connection with FIG. 3.

In an example embodiment, the circuit 106 may be implemented as a disparity engine. The circuit 106 may be implemented using any hardware, software, and/or combination of hardware and software that calculates disparity, including, but not limited to, conventional disparity calculating circuitry. In an example, hardware implementations of the circuit 106 may include, but are not limited to, field programmable gate arrays (FPGAs) and application specific integrated circuits (ASICs). In an example embodiment, the circuit 108 may be implemented as an object detection/reconstruction circuit. The circuit 108 may be implemented using any hardware, software, and/or combination of hardware and software that detects and/or reconstructs objects within images, including, but not limited to, conventional techniques for detecting and/or reconstructing objects. In an example, hardware implementations of the circuit 108 may include, but are not limited to, field programmable gate arrays (FPGAs) and application specific integrated circuits (ASICs).

In an example embodiment, the block 102 may be implemented as a generative neural network model and the block 104 may be implemented as a discriminative neural network model. In various embodiments, the block 102 may be utilized during both training and inference (deployment) phases of the circuit 100, while the block 104 may be utilized only during the training phase. In some embodiments, the block 104 may be present but inactive after deployment (e.g., illustrated by the dashed line). In some embodiments, the block 104 may be omitted from instances of the circuit 100 being deployed. In various embodiments, the block 102 may have an input that may receive a number of scaled disparity maps (e.g., a disparity map for each scale of a disparity map pyramid) and an output that may present a fused disparity map. The fused disparity map may be generated by the block 102 from the number of scaled disparity maps based on the weights 102a.

In an example embodiment, the circuit 106 may have a first input that may receive the signal R_IMAGES, a second input that may receive the signal L_IMAGES, and an output that may communicate the number of scaled disparity maps to the block 102. The output of the block 102 may be coupled to an input of the circuit 108. In an example embodiment, the signals R_IMAGES and L_IMAGES may be communicated to the circuit 106 using one or more memories or buffers (not shown). In another example, the signals R_IMAGES and L_IMAGES may also be communicated to the block 102 to further improve the fused disparity values generated by the block 102.

Figure 2:
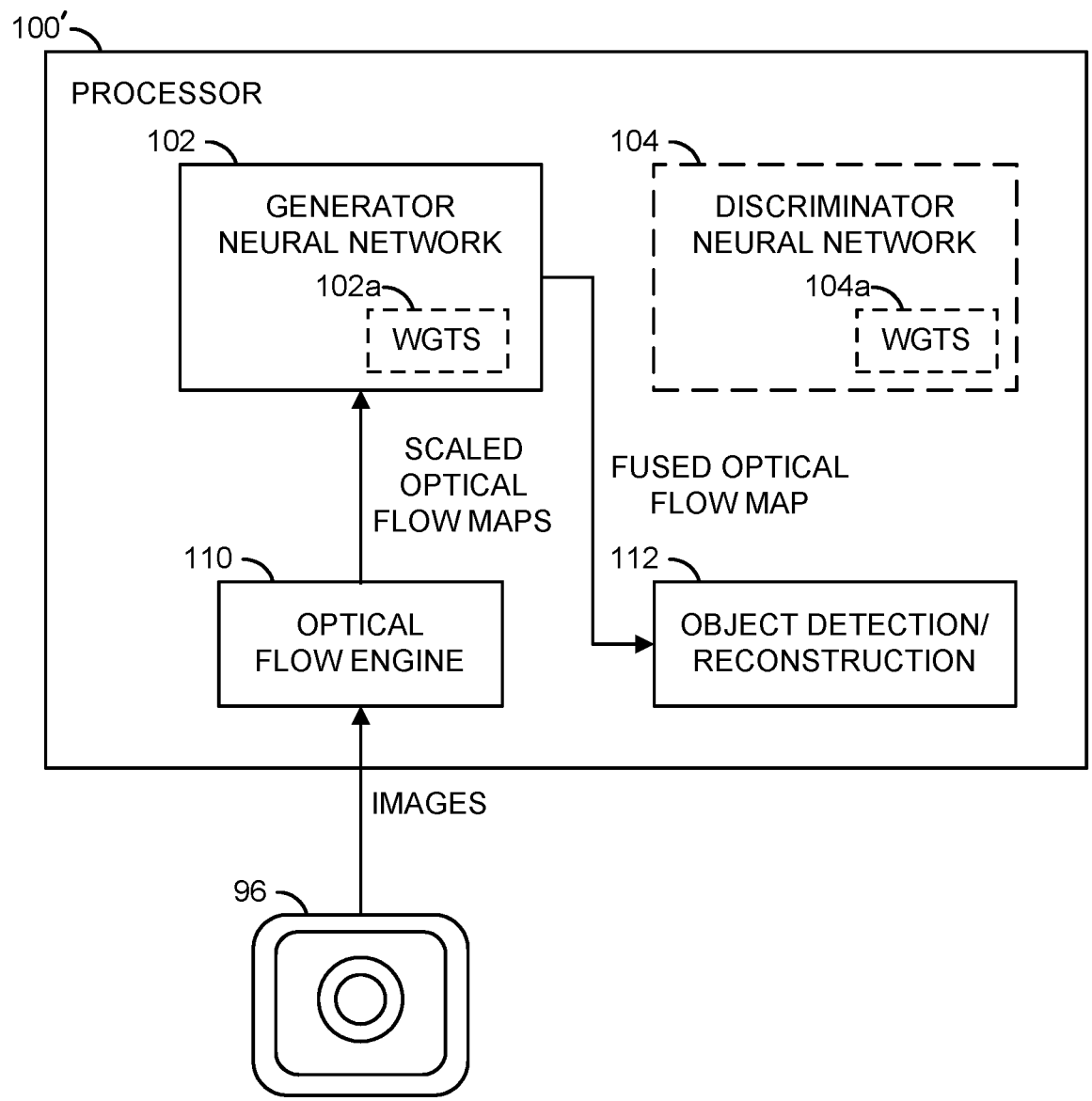
FIG. 2 is a diagram illustrating a processor in accordance with an example embodiment of the invention in a context of a temporal image sequence application.

Referring to FIG. 2, a diagram is shown illustrating a processor in accordance with an example embodiment of the invention in a context of a temporal image sequence application. In an example, a circuit 100' may implement a processor in accordance with another example embodiment of the invention. In an example, the circuit 100' may be configured to received images from a camera assembly 96. In an example, the circuit 100' may receive a signal (e.g., IMAGES) from the camera assembly 96. The signal IMAGES may communicate a sequence of images from the camera assembly 96 to the circuit 100'.

In various embodiments, the circuit 100' may be configured to calculate optical flow values between pairs of images of the signal IMAGES. In an example, the optical flow values may be utilized for object detection and/or reconstruction. In another example, the optical flow values may be utilized for object tracking, depth measurement calculation, object speed and/or motion determination, etc. In general, optical flow comprises depth information that may be utilized in any application needing three-dimensional (3D) information (e.g., 3D reconstruction).

In an example embodiment, the circuit 100' may comprise the block (or circuit) 102, the block (or circuit) 104, a block (or circuit) 110, and a block (or circuit) 112. In an example embodiment, the circuit 110 may be implemented as an optical flow engine. The circuit 110 may be implemented using any hardware, software, and/or combination of hardware and software that calculates optical flow, including conventional optical flow calculating circuitry. In an example, hardware implementations of the circuit 110 may include, but are not limited to, field programmable gate arrays (FPGAs) and application specific integrated circuits (ASICs). In an example embodiment, the circuit 112 may be implemented as an object detection/reconstruction circuit. In various embodiment, the circuit 112 is generally implemented differently than the circuit 108. In an example, the circuit 108 may be configured to receive one-dimensional (1D) disparity values while the circuit 112 may be configured to receive two-dimensional (2D) optical flow values. In various embodiments, the input data of the circuit 112 generally contains horizontal and vertical shift information.

In an example, each of the neural networks of the blocks 102 and 104 may be implemented using a directed acyclic graph (DAG) and a corresponding set of weights 102a and 104a. The corresponding sets of weights may be determined using an unsupervised training process described below in connection with FIG. 3. In an example embodiment, the block 102 may be implemented as a generative neural network model and the block 104 may be implemented as a discriminative neural network model. In various embodiments, the block 102 may be utilized during both training and deployment phases of the circuit 100', while the block 104 may be utilized only during the training phase. In some embodiments, the block 104 may be present but inactive after deployment (e.g., illustrated by the dashed line). In some embodiments, the block 104 may be omitted from instances of the circuit 100' being deployed. In various embodiments, the block 102 may have an input that may receive a number of scaled optical flow maps (e.g., an optical flow map for each scale of an optical flow map pyramid) and an output that may present a fused optical flow map. The fused optical flow map may be generated by the block 102 from the number of scaled optical flow maps based on the weights 102a.

In an example embodiment, the circuit 110 may have a first input that may receive the signal IMAGES and an output that may communicate the calculated optical flow values of the number of scaled optical flow maps to the block 102. The output of the block 102 may be coupled to an input of the circuit 112. The block 102 may be configured to communicate two-dimensional (2D) fused optical flow values to the circuit 112. In an example embodiment, the signal IMAGES may be communicated to the circuit 110 using one or more memories or buffers (not shown). In another example, the signal IMAGES may also be communicated to the block 102 to further improve the fused optical flow values generated by the block 102.

Figure 3:
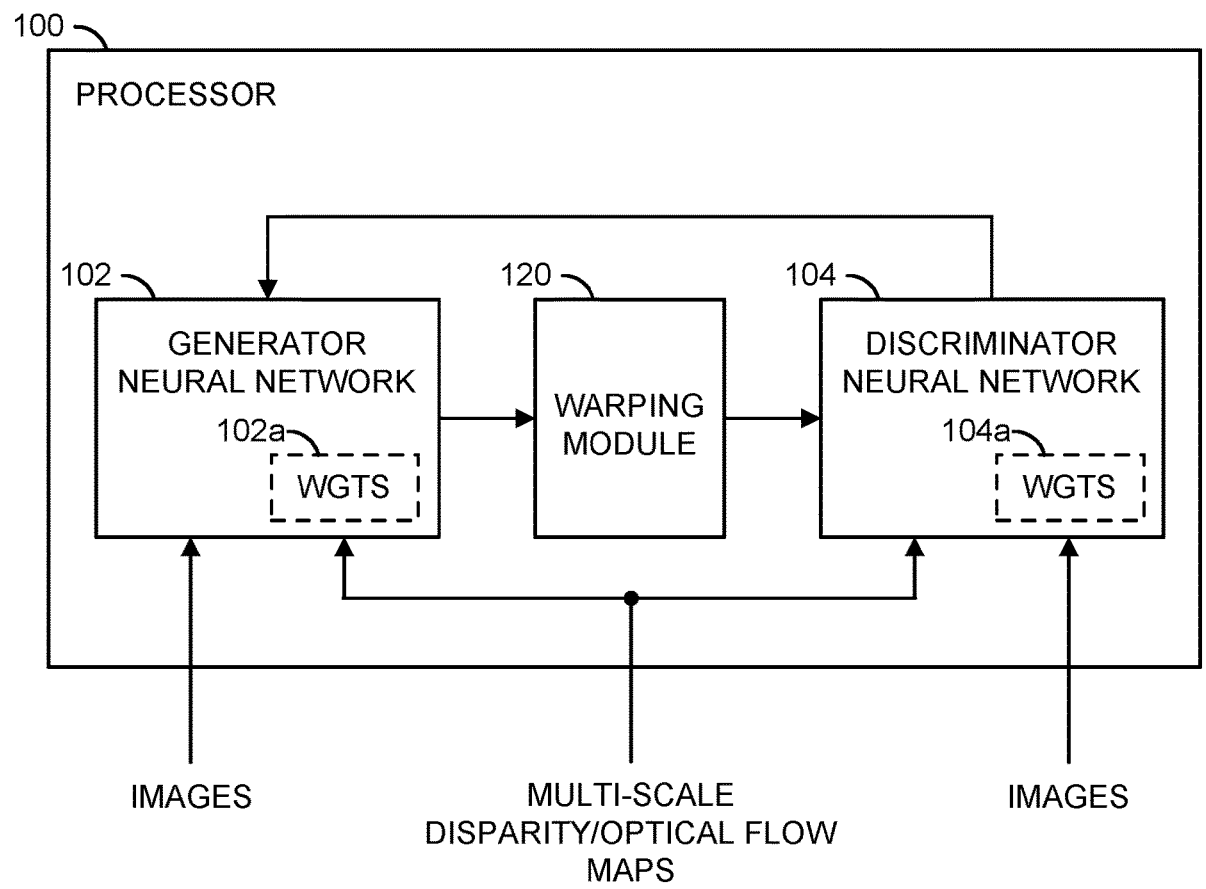
FIG. 3 is a diagram illustrating a processor in accordance with an example embodiment of the invention in a training configuration.

Referring to FIG. 3, a block diagram is shown illustrating a training data flow configuration in accordance with an embodiment of the invention. In various embodiments, two neural networks may be implemented. The neural network 102 may be configured as a generator network and the neural network 104 may be configured as a discriminator network. In various embodiments, the first and second neural networks are generally implemented with similar architectures. In an example, first and second neural networks may be implemented as convolutional neural networks (CNNs) or deep convolutional neural networks (DCNNs). However, other network architectures may be implemented to meet design criteria of a particular application.

In various embodiments, the neural networks 102 and 104 may be connected to form a generative adversarial network (GAN) during the training phase of operation of the circuits 100 and 100'. The network 102 may receive images at a first input and values of a number of scaled disparity (or optical flow) maps at a second input. The network 102 may be configured to extract features from images received as inputs to the network 102 and generate a fused disparity (or optical flow) map from the values of the number of scaled disparity (or optical flow) maps also received as inputs. The fused disparity (or optical flow) map generated by the network 102 may be used to generate regenerated images using a warping module 120. In various embodiments, the warping module 120 may generate the regenerated images by performing a warping operation on a first (e.g., left, or temporally earlier) image to generate a second (e.g., right, or temporally later) image based upon the fused disparity (or optical flow) map. In some embodiments, the warping module 120 may generate the regenerated images by performing a warping operation on a first (e.g., right, or temporally later) image to generate a second (e.g., left, or temporally earlier) image based upon the fused disparity (or optical flow) map.

The neural network 104 may have a first input that may receive the regenerated images from the warping module 120, a second input that may receive the original images, a third input that may receive the values of the number of scaled disparity (or optical flow) maps, and an output that may provide information for modifying the weights 102a utilized in layers of the neural network 102. During the training phase, the neural network 104 may be configured to indicate a probability of whether an input image is a regenerated (e.g., right, or temporally later) image created by the warping module 120 or an original captured image. During the training phase, the network 104 may take an image from the training dataset (e.g., original captured images) and the generated image from the warping module 120. When the network 104 successfully identifies the real and generated images, the parameters of the network 104 generally remain unchanged, but the parameters of the network 102 are generally updated to improve the generated images. When the network 102 fools the network 104, the parameters of the network 102 generally remain unchanged, but the parameters of the network 104 (e.g., the weights 104a) are generally updated to improve the classification of the input images. When a predetermined threshold is met, the network 102 generates replicas of the original captured images every time and the network 104 is unable to tell the difference and predicts unsure in each case. In an example, the threshold may be 50% for original captured and generated. However, other threshold values may be implemented to meet criteria of a particular application. When the predetermined threshold is met, the network 102 may be deployed (e.g., utilization for inference operation without the network 104).

Referring to FIGS. 4-8, block diagrams are shown illustrating a data flow for multi-scale disparity fusion in accordance with an example embodiment of the invention. In various embodiments, a process for implementing multi-scale disparity fusion generally utilizes a one-dimensional (1D) warp engine to generate the regenerated images.

Figure 4:
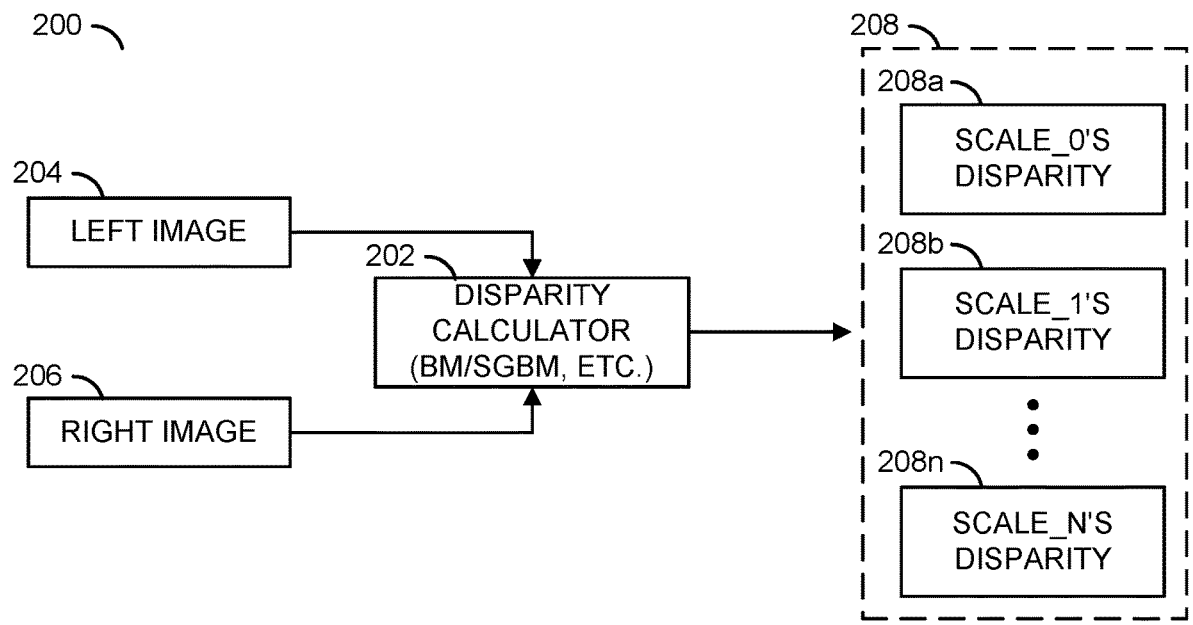
FIG. 4 is a diagram illustrating a process of generating multi-scale disparity maps.

Referring to FIG. 4, a diagram is shown illustrating a process 200 of generating multi-scale disparity maps. In an example embodiment, a disparity calculator 202 may receive a left image 204 and a right image 206. The disparity calculator 202 may be configured to compare the images to generate multi-scale disparity maps 208. In an example, the disparity calculator 202 may use a pyramid method to compute disparity values at a plurality of resolutions (or scales) 208a-208n. In an example, small changes may be neglected as the process 200 goes to lower resolution and large changes may be reduced to small changes. The disparity values may be calculated along with scale.

Figure 5:
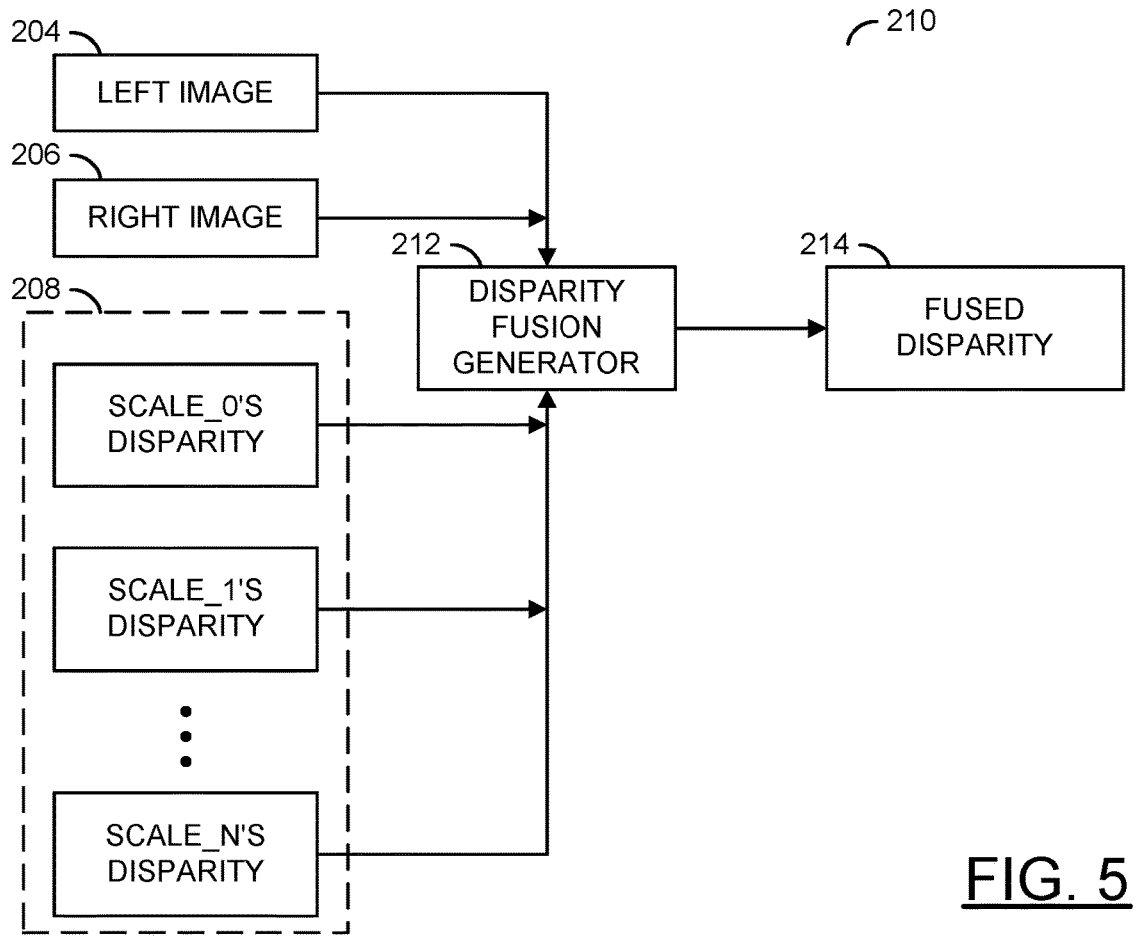
FIG. 5 is a diagram illustrating a process of generating a fused disparity map.

Referring to FIG. 5, a diagram is shown illustrating a process 210 of generating a fused disparity map. In an example embodiment, a disparity fusion generator 212 may be configured to receive the left image 204, the right image 206, and the multi-scale disparity maps 208. Based on the left image 204, the right image 206, and the multi-scale disparity maps 208, the disparity fusion generator 212 may generate a fused disparity map 214. In an example, the disparity fusion generator 212 may be implemented as an artificial neural network that takes disparity values from each of the multi-scale disparity maps 208 and left/right images as input, and outputs a fused disparity map. In various embodiments, the disparity fusion generator 212 combines disparity values from each of the multi-scale disparity maps 208 together, and generates an output that results in a better quality disparity map. The output generally provides a better quality disparity map because (i) calculating disparity in high resolution images only cannot generate a dense disparity map due to noise, and (ii) calculating disparity in low resolution images only allows a denser disparity map to be obtained, but with less accurate disparity. In various embodiments, the disparity fusion generator 212 is implemented using the network 102.

Figure 6:
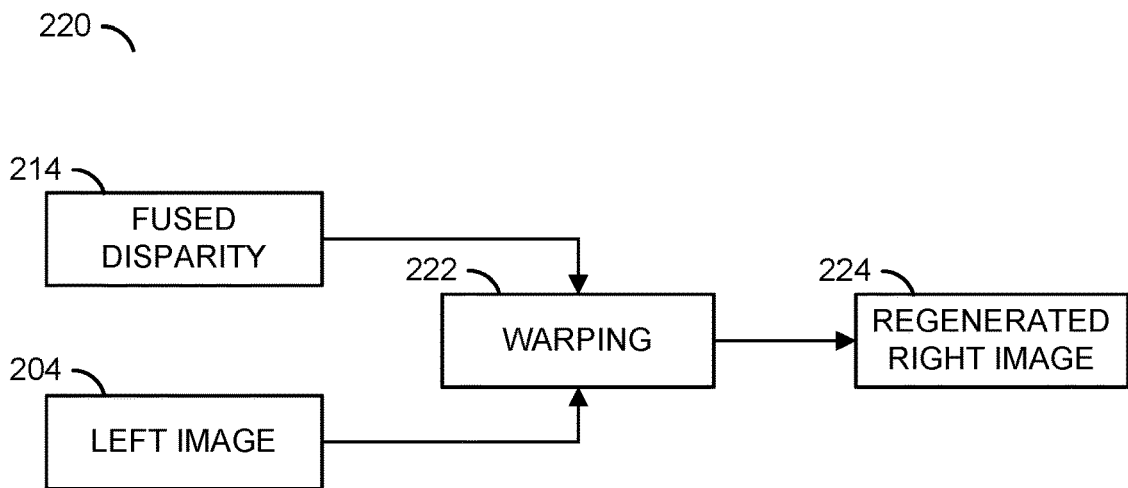
FIG. 6 is a diagram illustrating a process of generating a regenerated image using the fused disparity map.

Referring to FIG. 6, a diagram is shown illustrating a process 220 of generating a regenerated image using the fused disparity map 214. In an example embodiment, a warping operation 222 may be configured to receive the left image 204 and the fused disparity map 214. Based on the fused disparity map 214, the warping operation 222 generally warps the left image 204 to generate a regenerated right image 224. In an example, the warping operation 222 generally implements a 1D warping scheme that takes data from the left image 204 and the fused disparity map 214 as input and generates corresponding right image data, which is presented as the output of the warping operation 222. In general, the fused disparity map 214 is used as providing a pixel shift in the horizontal direction. In another example, the warping operation 222 may be configured to receive the right image 206 and the fused disparity map 214, and, based on the fused disparity map 214, warp the right image 206 to generate a regenerated left image (not shown).

Figure 7:
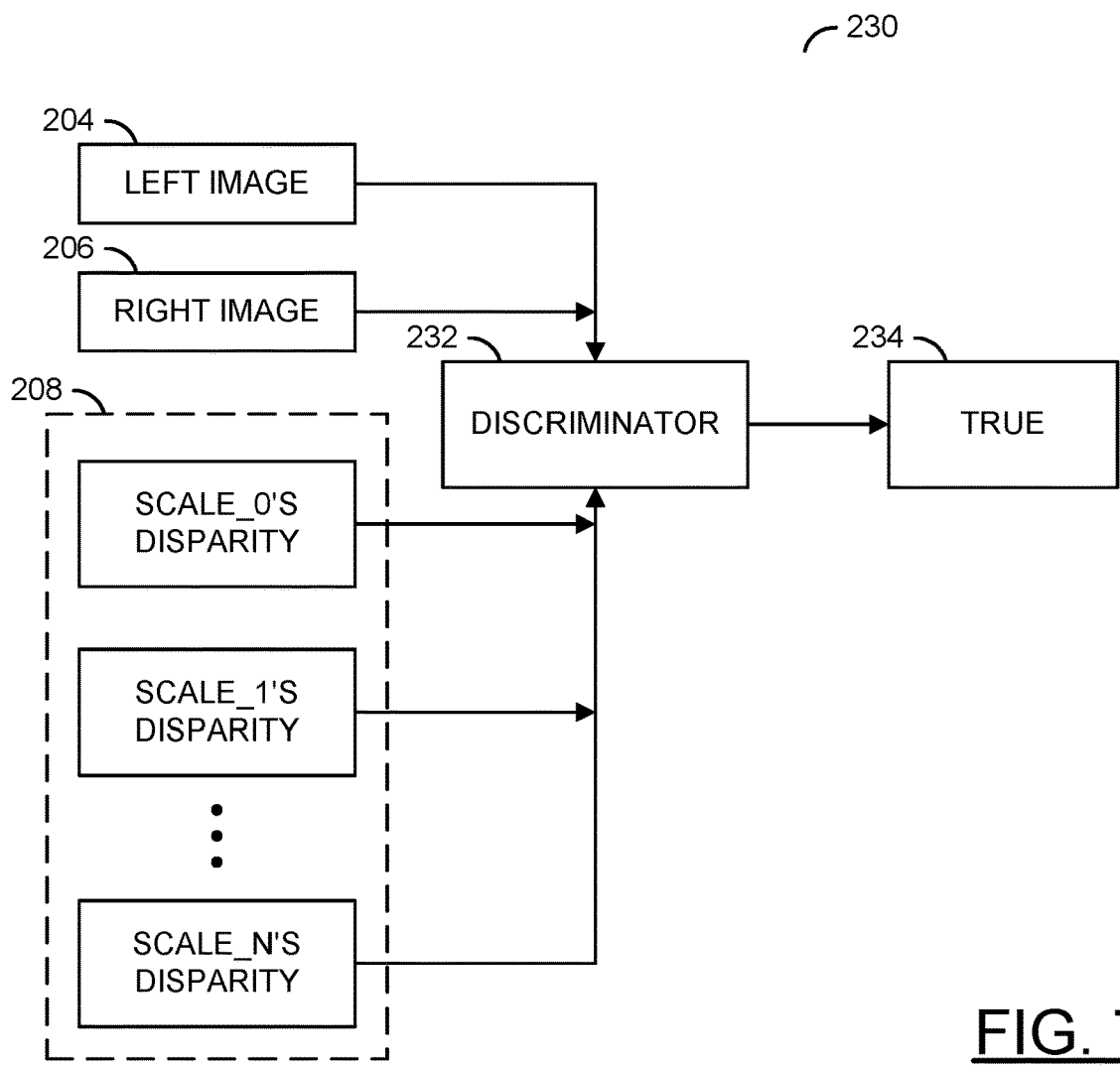
FIG. 7 is a diagram of illustrating a process in accordance with an example embodiment of the invention.

Referring to FIG. 7, a diagram is shown illustrating a classification process 230 in accordance with an example embodiment of the invention. During the training phase, a discriminator 232 (e.g, the network 104) may receive the captured left image 204, the captured right image 206, and the multi-scale disparity maps 208. The discriminator 232 may be configured to use features extracted from the input images (e.g., images 204 and 206) and the multi-scale disparity maps 208 to determine whether or not the images are actual captured images. The discriminator 232 may be trained to assert a TRUE state 234 in response to the input of the captured right image 206.

Figure 8:
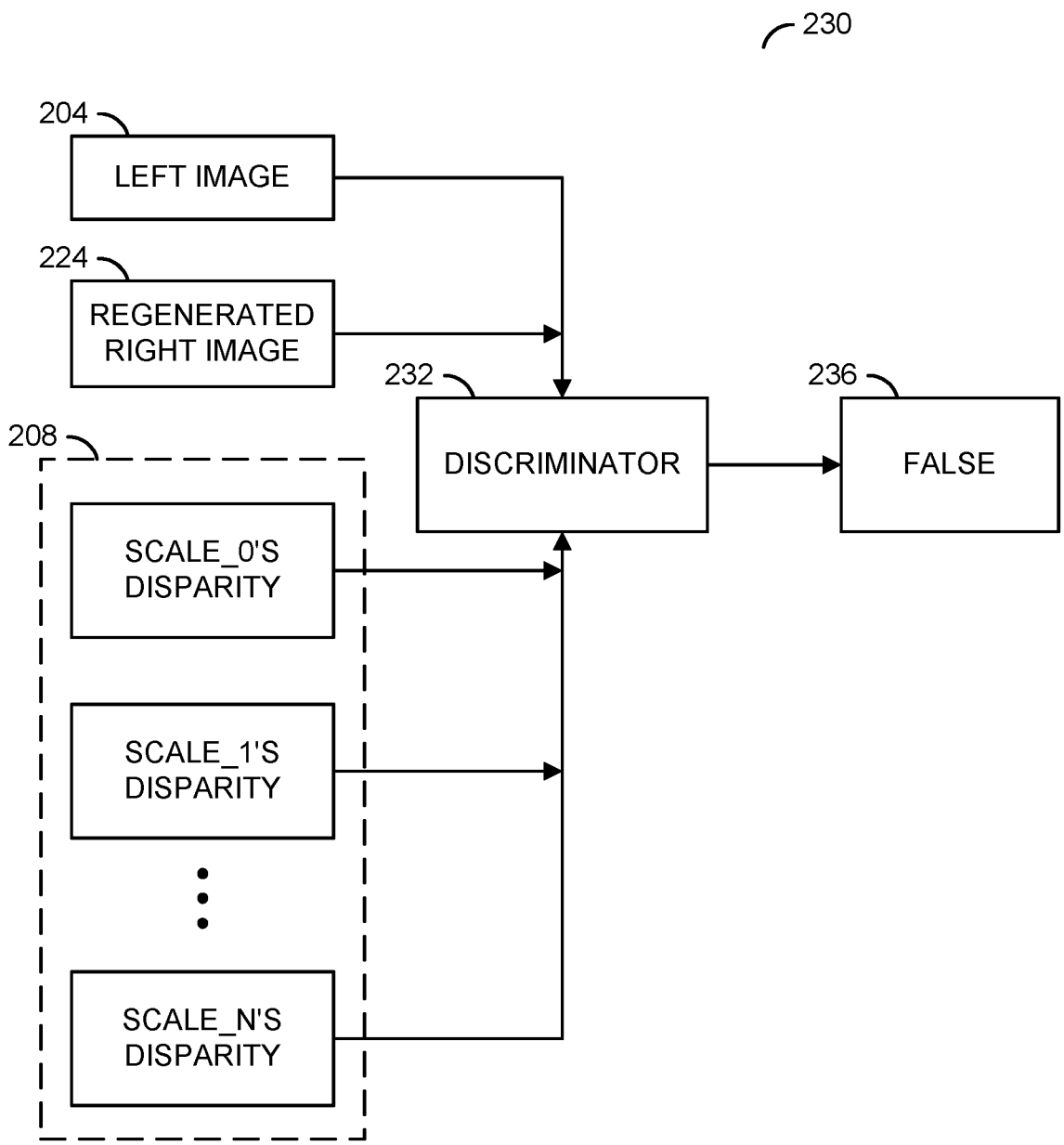
FIG. 8 is a diagram illustrating another process in accordance with an example embodiment of the invention.

Referring to FIG. 8, a diagram is shown illustrating another example of the classification process 230 in accordance with an example embodiment of the invention. During the training phase, the discriminator 232 (e.g, the network 104) may also receive the captured left image 204, the regenerated right image 224, and the multi-scale disparity maps 208. The discriminator 232 may be configured to use features extracted from the input images (e.g., images 204 and 224) and the multi-scale disparity maps 208 to determine whether or not one of the images is a regenerated image. The discriminator 232 may be trained to assert a FALSE state 236 in response to the input of the regenerated right image 224 instead of the captured right image 206.

Referring to FIGS. 9-13, block diagrams are shown illustrating a data flow for multi-scale optical flow fusion in accordance with an embodiment of the invention. In various embodiments, multi-scale optical flow fusion utilizes a two-dimensional (2D) warp engine in place of the 1D warp engine used in disparity fusion.

Figure 9:
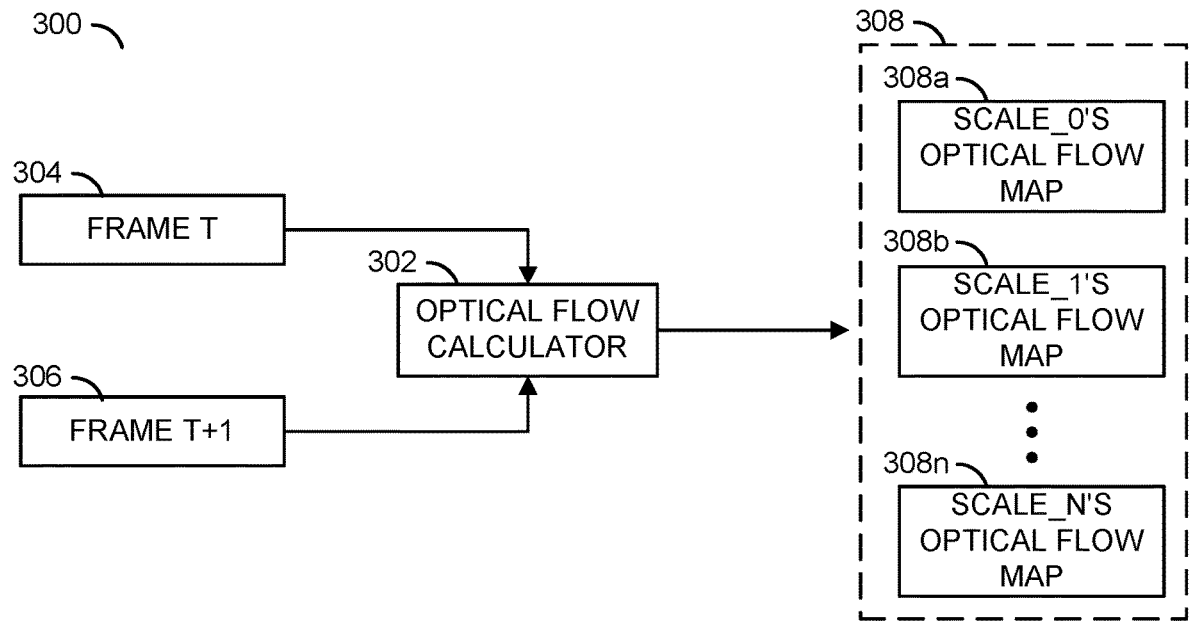
FIG. 9 is a diagram illustrating a process of generating multi-scale optical flow maps.

Referring to FIG. 9, a diagram is shown illustrating a process 300 of generating multi-scale optical flow maps. In an example embodiment, an optical flow calculator 302 may receive a first image frame 304 and a second image frame 306. The first image frame 304 may be from a time T and the second image frame may be from a time T+1. The optical flow calculator 302 may be configured to compare the images to generate a multi-scale optical flow map 308. In an example, the optical flow calculator 302 may use a pyramid method to compute optical flow values at a plurality of resolutions (or scales) 308a-308n. In an example, small motions may be neglected as the process 300 goes to lower resolution and large motions may be reduced to small motions. The process 300 may calculate optical flow along with scale.

Figure 10:
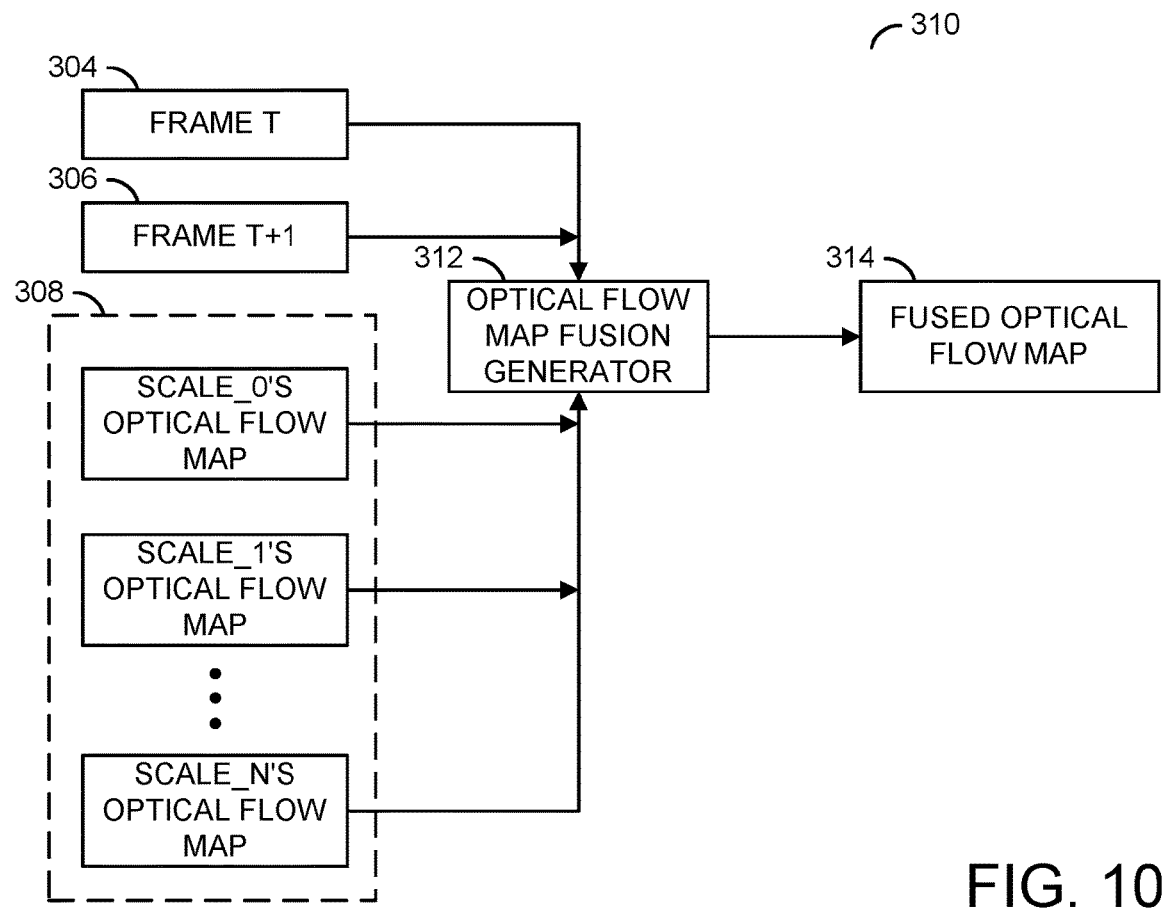
FIG. 10 is a diagram illustrating a process of generating a fused optical flow map.

Referring to FIG. 10, a diagram is shown illustrating a process 310 of generating a fused optical flow map. In an example embodiment, an optical flow map fusion generator 312 may be configured to receive the first image frame 304, the second (later) image frame 306, and the multi-scale optical flow maps 308. In various embodiments, the optical flow map fusion generator 312 is implemented using the network 102. Based on features extracted from the first image frame 304 and the second (later) image frame 306, and the multi-scale optical flow maps 308, the optical flow map fusion generator 312 may generate a fused optical flow map 314.

In various embodiments, the optical flow map fusion generator 312 is generally implemented as an artificial neural network that takes the optical flow map of each scale and two sequential images as input, and outputs a fused optical flow map 314. Since the optical flow map fusion generator 312 combines the optical flow maps of each scale together, the fused optical flow map 314 generated by the optical flow map fusion generator 312 is generally of better quality than one produced using a conventional technique.

Figure 11:
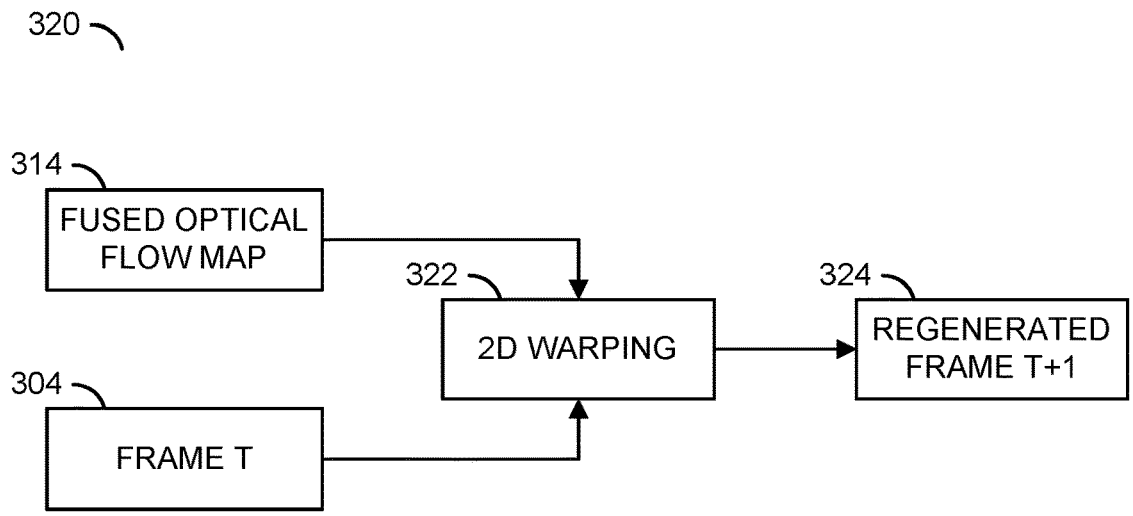
FIG. 11 is a diagram illustrating a process of generating a regenerated image using the fused optical flow map.

Referring to FIG. 11, a diagram is shown illustrating a process 320 of generating a regenerated image using the fused optical flow map 314. In an example embodiment, a 2D warping operation 322 may be configured to receive the first image frame 304 and the fused optical flow map 314. Based on the fused optical flow map 314, the 2D warping operation 322 generally warps the first (earlier) image frame 304 to generate a regenerated later (e.g., Frame T+1) image frame 324. In various embodiments, the 2D warping operation 322 takes a previous image and the fused optical flow map 314 as inputs and outputs (generates) a corresponding next frame image. In an example, the fused optical flow map 314 may be used to specify a pixel shift in both horizontal and vertical directions.

Figure 12:
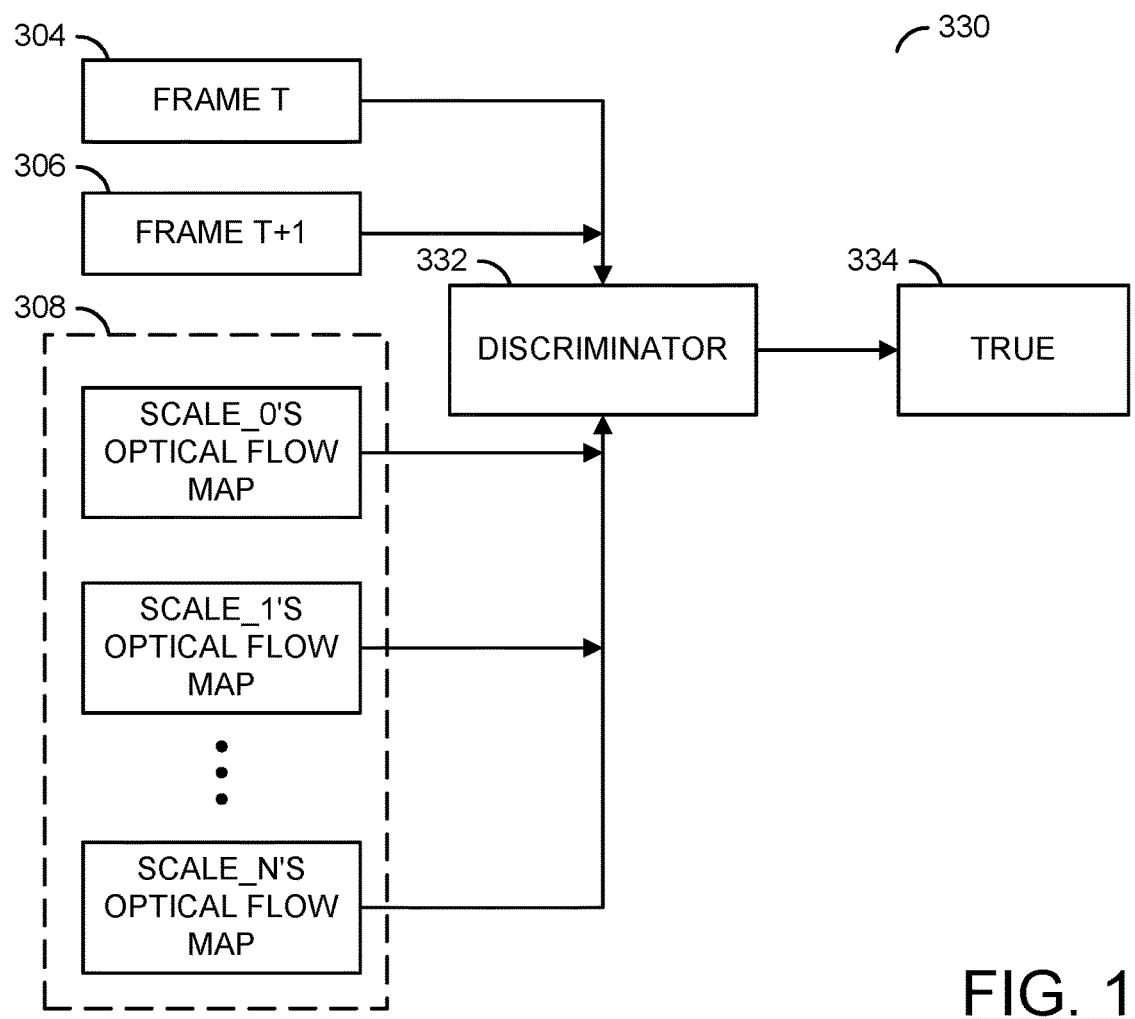
FIG. 12 is a diagram illustrating a process in accordance with an example embodiment of the invention.

Referring to FIG. 12, a diagram is shown illustrating a classification process 330 in accordance with an example embodiment of the invention. During the training phase, a discriminator 332 (e.g, the network 104) may receive the temporally earlier image frame 304, the temporally later image frame 306, and the multi-scale optical flow maps 308. The discriminator 332 may be configured to use features extracted from the input images (e.g., images 304 and 306) and the multi-scale disparity maps 308 to determine whether or not one of the images is the temporally later image frame. The discriminator 332 may be trained to assert a TRUE state 334 in response to the input of the temporally later image frame 306.

Figure 13:
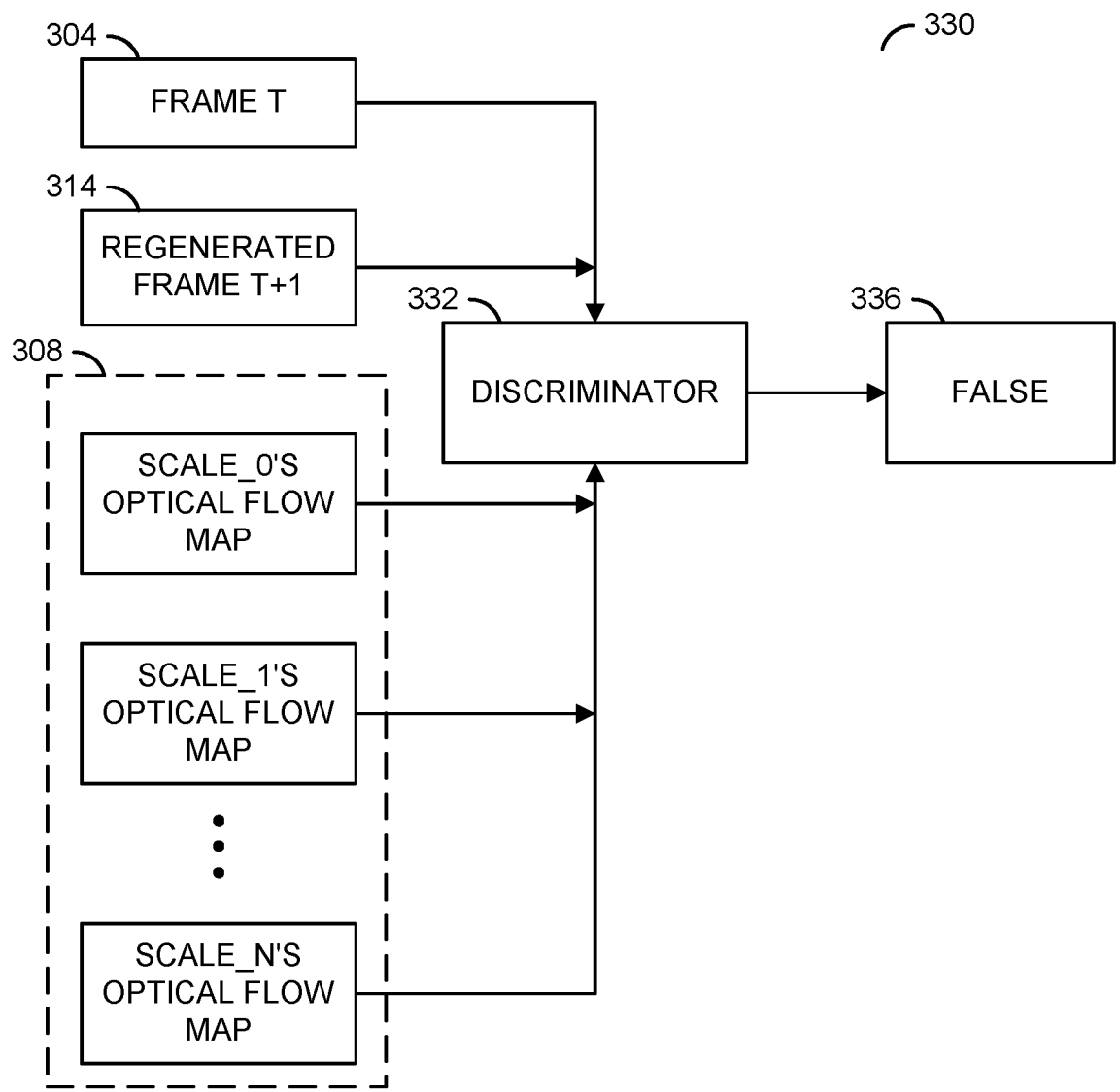
FIG. 13 is a diagram illustrating another process in accordance with an example embodiment of the invention.

Referring to FIG. 13, a diagram is shown illustrating another example of the classification process 330 in accordance with an example embodiment of the invention. During the training phase, the discriminator 332 (e.g, the network 104) may receive the temporally earlier image frame 304, the regenerated temporally later image frame 324, and the multi-scale optical flow maps 308. The discriminator 332 may be trained to assert a FALSE state 336 in response to the input image being the regenerated temporally later image frame 324 instead of the captured temporally later image frame 306.

Figure 14:
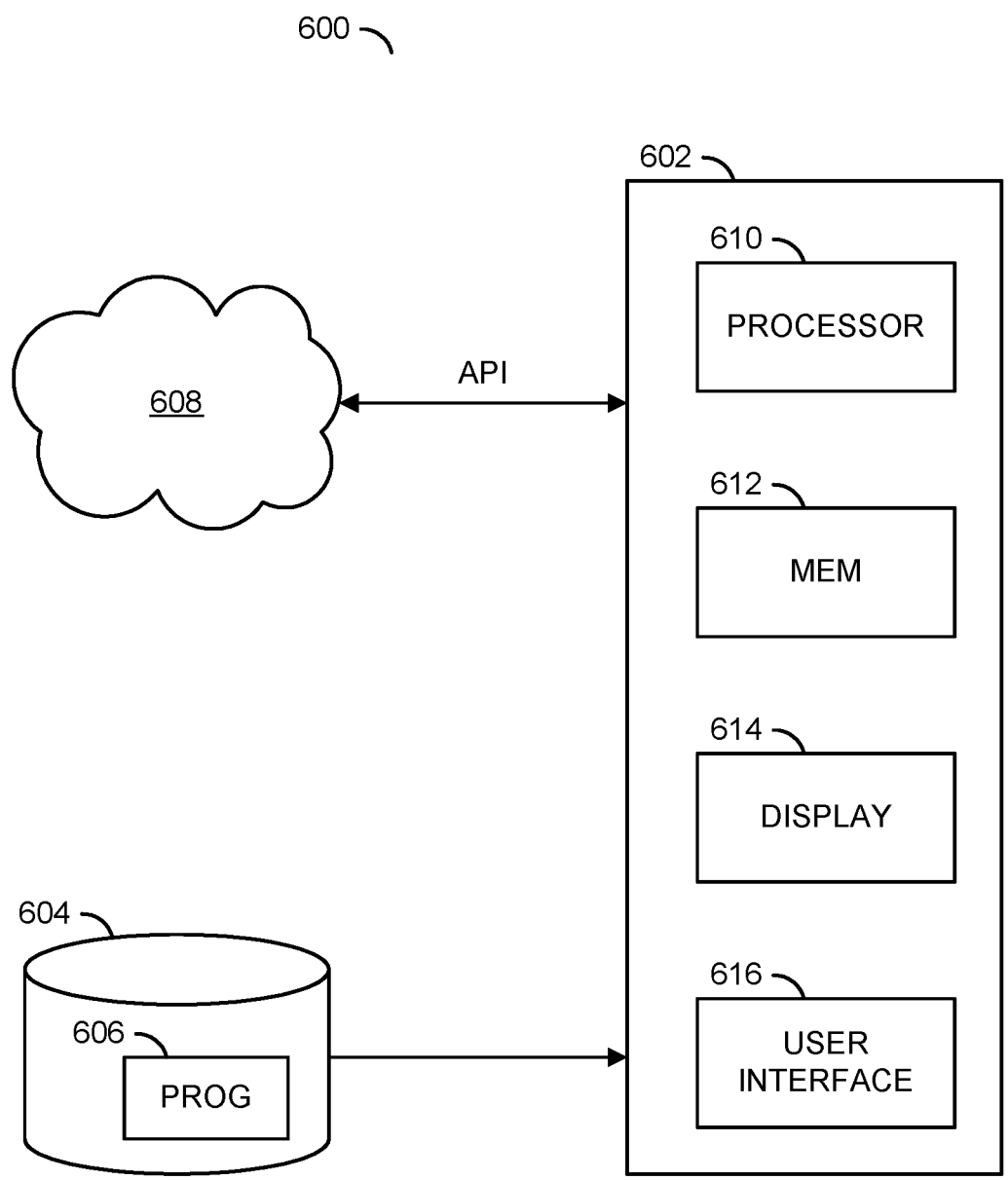
FIG. 14 is a diagram illustrating an example of a computer system in which an unsupervised training process in accordance with an example embodiment of the invention may be implemented.

Referring to FIG. 14, a diagram is shown illustrating a context in which an unsupervised training process in accordance with an example embodiment of the invention may be implemented. In an example, a system 600 may be configured (e.g., through software) to perform the unsupervised training process in accordance with an example embodiment of the invention described above in connection with FIG. 3. In an example, the system 600 may comprise a computer 602 and a computer readable storage medium 604. In an example, the computer 602 may be implemented as a general purpose computer system. In an example, the computer readable storage medium 604 may comprise non-volatile media including, but not limited to, a magnetic storage medium (e.g., a hard disk drive or HDD), an optical storage medium (e.g., compact disc (CD), digital video disc (DVD), BluRay disc (BD), a solid state drive (SSD), Flash memory, and/or a network associated storage system (NAS). In an example, the computer 602 and the computer readable storage medium 604 may be coupled together to exchange programs and data. In an example, a program (or programs) 606 implementing the unsupervised training process illustrated in FIG. 3 may be stored on the computer readable storage medium 604 or in cloud based resources 608. In an example, the computer 602 may be further configured to perform the unsupervised training process in accordance with an example embodiment of the invention utilizing the cloud resources 608. In an example, the computer 602 may be configured to perform the program (or programs) 606 implementing the unsupervised training process in accordance with an example embodiment of the invention via one or more application program interfaces (APIs).

In an example, the computer 602 may include, but is not limited to, a processor 610, memory 612, a display 614, and a user interface 616. In various embodiments, the processor 610 may include, but is not limited to, a central processing unit (CPU), a graphics processing unit (GPU), and a video processing unit (VPU). In various embodiments, the memory 612 may include, but is not limited to, random access memory (e.g., SRAM, DRAM, FLASH, etc.), read only memory (ROM), and cache memory. The display 614 and the user interface 616 generally allow a user to initiate and monitor the computer 602 performing the program (or programs) 606 implementing the unsupervised training process in accordance with an example embodiment of the invention during the training and/or quantization phases.

Figure 15:
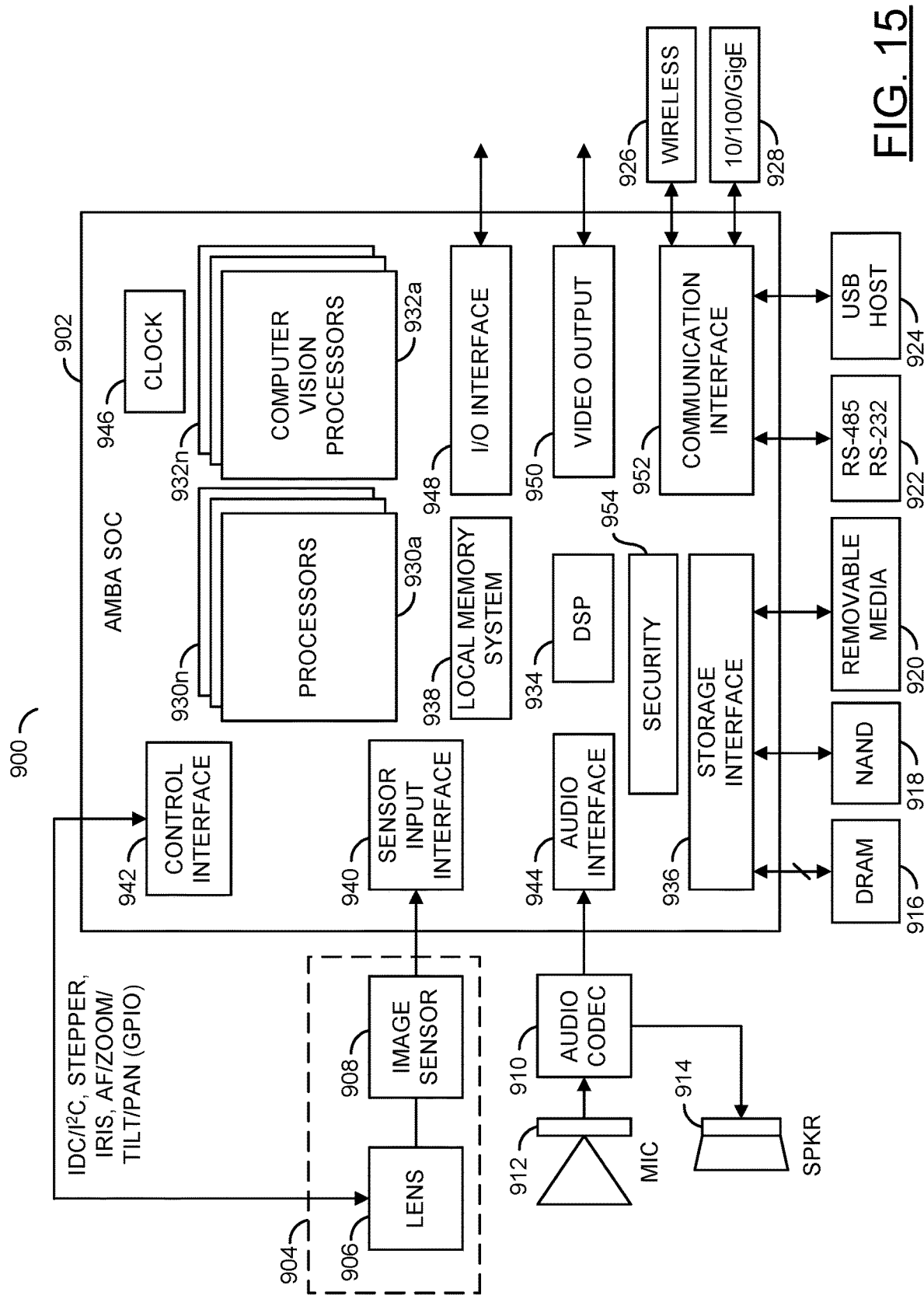
FIG. 15 is a diagram of a camera system illustrating an example implementation of a computer vision system in which a multi-scale disparity/optical flow fusion algorithm in accordance with example embodiments of the invention may be implemented.

Referring to FIG. 15, a diagram of a camera system 900 is shown illustrating an example implementation of a computer vision system in which a multi-scale disparity/optical flow fusion algorithm in accordance with example embodiments of the invention may be implemented. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 14.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as a single sensor. In another example, the circuit 908 may be implemented as a stereo pair of sensors. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor(s) 908 may receive light from the lens assembly 906. The image sensor(s) 908 may be configured to transform the received focused light into digital data (e.g., bitstreams). In some embodiments, the image sensor(s) 908 may perform an analog to digital conversion. For example, the image sensor(s) 908 may perform a photoelectric conversion of the focused light received from the lens assembly 906. The image sensor(s) 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 168 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP), and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE_M, NB-IoT, etc. The processor/camera circuit 902 may also include support for communication using one or more of the universal serial bus protocols (e.g., USB 1.0, 2.0, 3.0, etc.).

Figure 16:
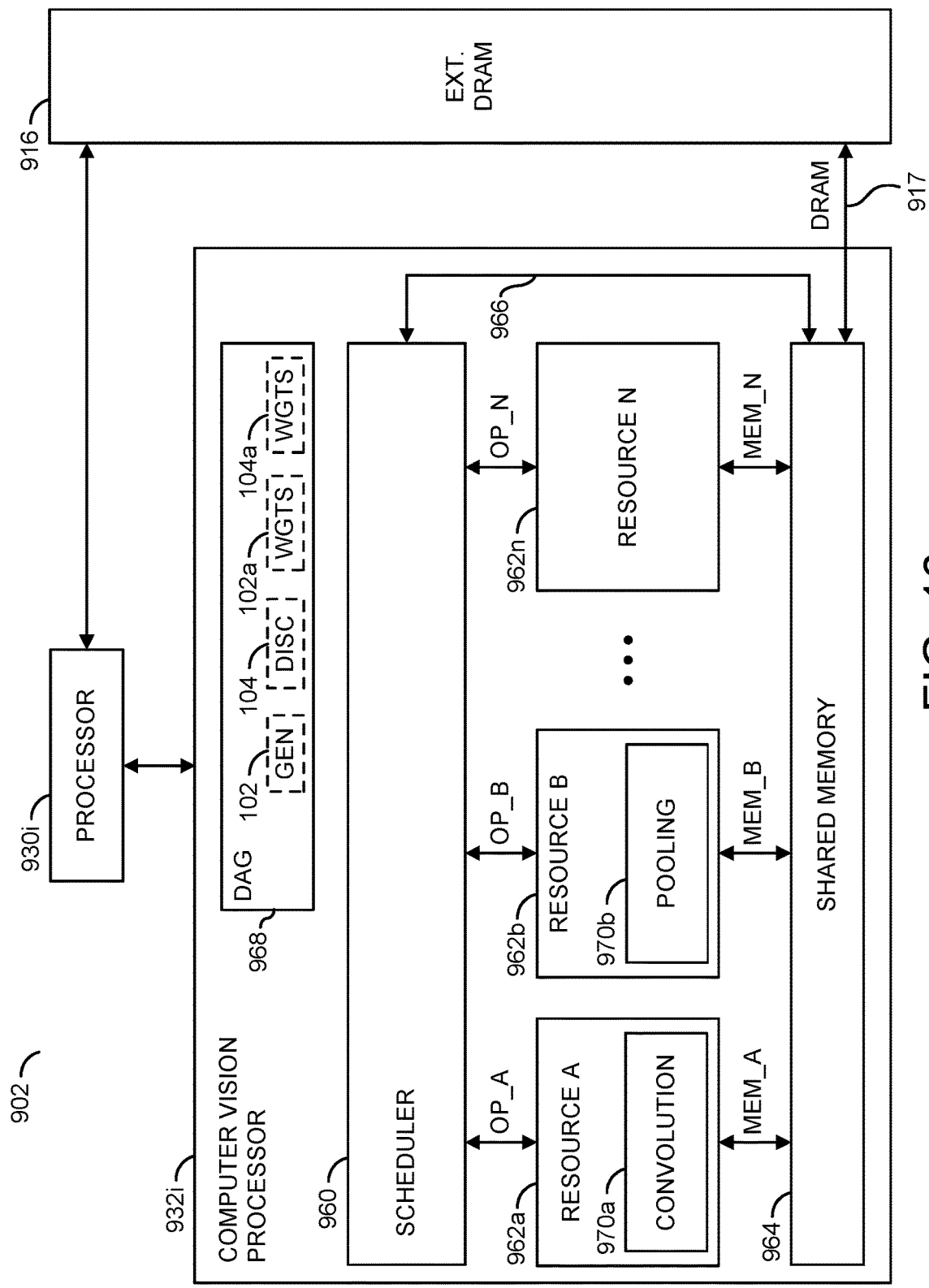
FIG. 16 is a diagram illustrating a context in which a disparity/optical flow fusion network in accordance with an example embodiment of the invention may be implemented.

Referring to FIG. 16, a diagram of a processing circuit 902 is shown illustrating a context in which a disparity/optical flow map fusion network in accordance with an example embodiment of the invention may be implemented. In various embodiments, the processing circuit 902 may be implemented as part of a computer vision system. In various embodiments, the processing circuit 902 may be implemented as part of a camera, a computer, a server (e.g., a cloud server), a smart phone (e.g., a cellular telephone), a personal digital assistant, or the like. In an example, the processing circuit 902 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuit 902 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processing circuit 902 may comprise a block (or circuit) 930$i$, a block (or circuit) 932$i$, a block (or circuit) 916, and/or a memory bus 917. The circuit 930$i$ may implement a first processor. The circuit 932$i$ may implement a second processor. In an example, the circuit 932$i$ may implement a computer vision processor. In an example, the processor 932$i$ may be an intelligent vision processor. The circuit 916 may implement an external memory (e.g., a memory external to the circuits 930$i$ and 932$i$). In an example, the circuit 916 may be implemented as a dynamic random access memory (DRAM) circuit. The processing circuit 902 may comprise other components (not shown). The number, type and/or arrangement of the components of the processing circuit 902 may be varied according to the design criteria of a particular implementation.

The circuit 930$i$ may implement a processor circuit. In some embodiments, the processor circuit 930$i$ may be implemented using a general purpose processor circuit. The processor 930$i$ may be operational to interact with the circuit 932$i$ and the circuit 916 to perform various processing tasks. In an example, the processor 930$i$ may be configured as a controller for the circuit 932$i$. The processor 930$i$ may be configured to execute computer readable instructions. In one example, the computer readable instructions may be stored by the circuit 916. In some embodiments, the computer readable instructions may comprise controller operations. The processor 930$i$ may be configured to communicate with the circuit 932$i$ and/or access results generated by components of the circuit 932$i$. In an example, the processor 930$i$ may be configured to utilize the circuit 932$i$ to perform operations associated with one or more neural network models.

In an example, the processor 930$i$ may be configured to program the circuit 932$i$ with one or more pre-trained artificial neural network models (ANNs) including a region proposal network (RPN) 100, a region-based convolutional neural network (RCNN) 102, and corresponding weights/kernels (WGTS) 104 related to the RPN 100 and the RCNN 102. In various embodiments, the RPN 100 and the RCNN 102 may be configured (trained and/or quantized) for operation in an edge device. In an example, the processing circuit 902 may be coupled to a sensor (e.g., video camera, etc.) configured to generate a data input. The processing circuit 902 may be configured to generate one or more outputs in response to the data input from the sensor based on one or more inferences made by executing the RPN 100 and the RCNN 102 with the corresponding weights/kernels (WGTS) 104. The operations performed by the processor 930$i$ may be varied according to the design criteria of a particular implementation.

In various embodiments, the circuit 916 may implement a dynamic random access memory (DRAM) circuit. The circuit 916 is generally operational to store multidimensional arrays of input data elements and various forms of output data elements. The circuit 916 may exchange the input data elements and the output data elements with the processor 930$i$ and the processor 932$i$.

The processor 932$i$ may implement a computer vision processor circuit. In an example, the processor 932$i$ may be configured to implement various functionality used for computer vision. The processor 932$i$ is generally operational to perform specific processing tasks as arranged by the processor 930$i$. In various embodiments, all or portions of the processor 932$i$ may be implemented solely in hardware. The processor 932$i$ may directly execute a data flow directed to multi-scale disparity/optical flow fusion, and generated by software (e.g., a directed acyclic graph, etc.) that specifies processing (e.g., computer vision) tasks. In some embodiments, the processor 932$i$ may be a representative example of numerous computer vision processors implemented by the processing circuit 902 and configured to operate together.

In an example embodiment, the processor 932$i$ generally comprises a block (or circuit) 960, one or more blocks (or circuits) 962$a$-962$n$, a block (or circuit) 960, a path 966, and a block (or circuit) 968. The block 960 may implement a scheduler circuit. The blocks 962$a$-962$n$ may implement hardware resources (or engines). The block 964 may implement a shared memory circuit. The block 968 may implement a directed acyclic graph (DAG) memory. In an example embodiment, one or more of the circuits 962$a$-962$n$ may comprise blocks (or circuits) 970$a$-970$n$. In the example shown, circuits 970$a$ and 970$b$ are implemented.

In an example embodiment, the circuit 970$a$ may implement convolution operations. In another example, the circuit 970$b$ may be configured to provide pooling operations. The circuits 970$a$ and 970$b$ may be utilized to provide multi-scale disparity/optical flow fusion in accordance with an example embodiment of the invention. The convolution and pooling operations may be used to perform computer (or machine) vision tasks (e.g., as part of an object detection process, etc.). In yet another example, one or more of the circuits 962$c$-962$n$ may comprise blocks (or circuits) 970$c$-970$n$ (not shown) to provide convolution calculations in multiple dimensions.

In an example, the circuit 932$i$ may be configured to receive directed acyclic graphs (DAGs) from the processor 930$i$. The DAGs received from the processor 930$i$ may be stored in the DAG memory 968. The circuit 932$i$ may be configured to execute DAGs for the generator neural network 102 and/or the discriminator neural network 104 using the circuits 960, 962$a$-962$n$, and 964.

Multiple signals (e.g., OP_A to OP_N) may be exchanged between the circuit 960 and the respective circuits 962$a$-962$n$. Each signal OP_A to OP_N may convey execution operation information and/or yield operation information. Multiple signals (e.g., MEM_A to MEM_N) may be exchanged between the respective circuits 962$a$-962$n$ and the circuit 964. The signals MEM_A to MEM_N may carry data. A signal (e.g., DRAM) may be exchanged between the circuit 916 and the circuit 964. The signal DRAM may transfer data between the circuits 916 and 960 (e.g., on the memory bus 966). The circuit 960 may implement a scheduler circuit. The scheduler circuit 960 is generally operational to schedule tasks among the circuits 962a-962n to perform a variety of computer vision related tasks as defined by the processor 930i. Individual tasks may be allocated by the scheduler circuit 960 to the circuits 962a-962n. The scheduler circuit 960 may allocate the individual tasks in response to parsing the directed acyclic graphs (DAGs) provided by the processor 930i. The scheduler circuit 960 may time multiplex the tasks to the circuits 962a-962n based on the availability of the circuits 962a-962n to perform the work. Each circuit 962a-962n may implement a processing resource (or hardware engine). The hardware engines 962a-962n are generally operational to perform specific processing tasks. The hardware engines 962a-962n may be implemented to include dedicated hardware circuits that are optimized for high-performance and low power consumption while performing the specific processing tasks. In some configurations, the hardware engines 962a-962n may operate in parallel and independent of each other. In other configurations, the hardware engines 962a-962n may operate collectively among each other to perform allocated tasks.

The hardware engines 962a-962n may be homogenous processing resources (e.g., all circuits 962a-962n may have the same capabilities) or heterogeneous processing resources (e.g., two or more circuits 962a-962n may have different capabilities). The hardware engines 962a-962n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator, and a power of two downsample operator, etc.

In various embodiments, the hardware engines 962a-962n may be implemented solely as hardware circuits. In some embodiments, the hardware engines 962a-962n may be implemented as generic engines that may be configured through circuit customization and/or software/firmware to operate as special purpose machines (or engines). In some embodiments, the hardware engines 962a-962n may instead be implemented as one or more instances or threads of program code executed on the processor 930i and/or one or more processors 932i, including, but not limited to, a vector processor, a central processing unit (CPU), a digital signal processor (DSP), or a graphics processing unit (GPU). In some embodiments, one or more of the hardware engines 962a-962n may be selected for a particular process and/or thread by the scheduler 960. The scheduler 960 may be configured to assign the hardware engines 962a-962n to particular tasks in response to parsing the directed acyclic graphs stored in the DAG memory 968.

The circuit 964 may implement a shared memory circuit. The shared memory 964 may be configured to store data in response to input requests and/or present data in response to output requests (e.g., requests from the processor 930i, the DRAM 916, the scheduler circuit 960 and/or the hardware engines 962a-962n). In an example, the shared memory circuit 964 may implement an on-chip memory for the computer vision processor 932i. The shared memory 964 is generally operational to store all of or portions of the multidimensional arrays (or vectors) of input data elements and output data elements generated and/or utilized by the hardware engines 962a-962n. The input data elements may be transferred to the shared memory 964 from the DRAM circuit 916 via the memory bus 917. The output data elements may be sent from the shared memory 964 to the DRAM circuit 916 via the memory bus 917.

The path 966 may implement a transfer path internal to the processor 932i. The transfer path 966 is generally operational to move data from the scheduler circuit 960 to the shared memory 964. The transfer path 966 may also be operational to move data from the shared memory 964 to the scheduler circuit 960.

The processor 930i is shown communicating with the computer vision processor 932i. The processor 930i may be configured as a controller for the computer vision processor 932i. In some embodiments, the processor 930i may be configured to transfer instructions to the scheduler 960. For example, the processor 930i may provide one or more directed acyclic graphs to the scheduler 960 via the DAG memory 968. The scheduler 960 may initialize and/or configure the hardware engines 962a-962n in response to parsing the directed acyclic graphs. In some embodiments, the processor 930i may receive status information from the scheduler 960. For example, the scheduler 960 may provide a status information and/or readiness of outputs from the hardware engines 962a-962n to the processor 930i to enable the processor 930i to determine one or more next instructions to execute and/or decisions to make. In some embodiments, the processor 930i may be configured to communicate with the shared memory 964 (e.g., directly or through the scheduler 960, which receives data from the shared memory 964 via the path 966). The processor 930i may be configured to retrieve information from the shared memory 964 to make decisions. The instructions performed by the processor 930i in response to information from the computer vision processor 932i may be varied according to the design criteria of a particular implementation.

The circuit 970a may implement a convolution circuit. The convolution circuit 970a may be in communication with the memory 964 to receive input data and present the output data. The convolution circuit 970a is generally operational to fetch a plurality of data vectors from the shared memory circuit 964. Each data vector may comprise a plurality of the data values. The convolution circuit 970a may also be operational to fetch a kernel from the shared memory 964. The kernel generally comprises a plurality of kernel values. The convolution circuit 970a may also be operational to fetch a block from the shared memory 964 to an internal (or local) buffer. The block generally comprises a plurality of input tiles. Each input tile may comprise a plurality of input values in multiple dimensions. The convolution circuit 970a may also be operational to calculate a plurality of intermediate values in parallel by multiplying each input tile in the internal buffer with a corresponding one of the kernel values and calculate an output tile comprising a plurality of output values based on the intermediate values. In various embodiments, the convolution circuit 970a may be implemented solely in hardware. An example of a convolution calculation scheme that may be used to implement the circuit 970a may be found in U.S. Pat. No. 10,210,768, which is herein incorporated by reference in its entirety. The circuit 970b may implement a pooling process. In various embodiments, a multi-scale disparity/optical flow fusion scheme in accordance with embodiments of the invention may be performed according to implementation descriptions provided herein.

Figure 17:
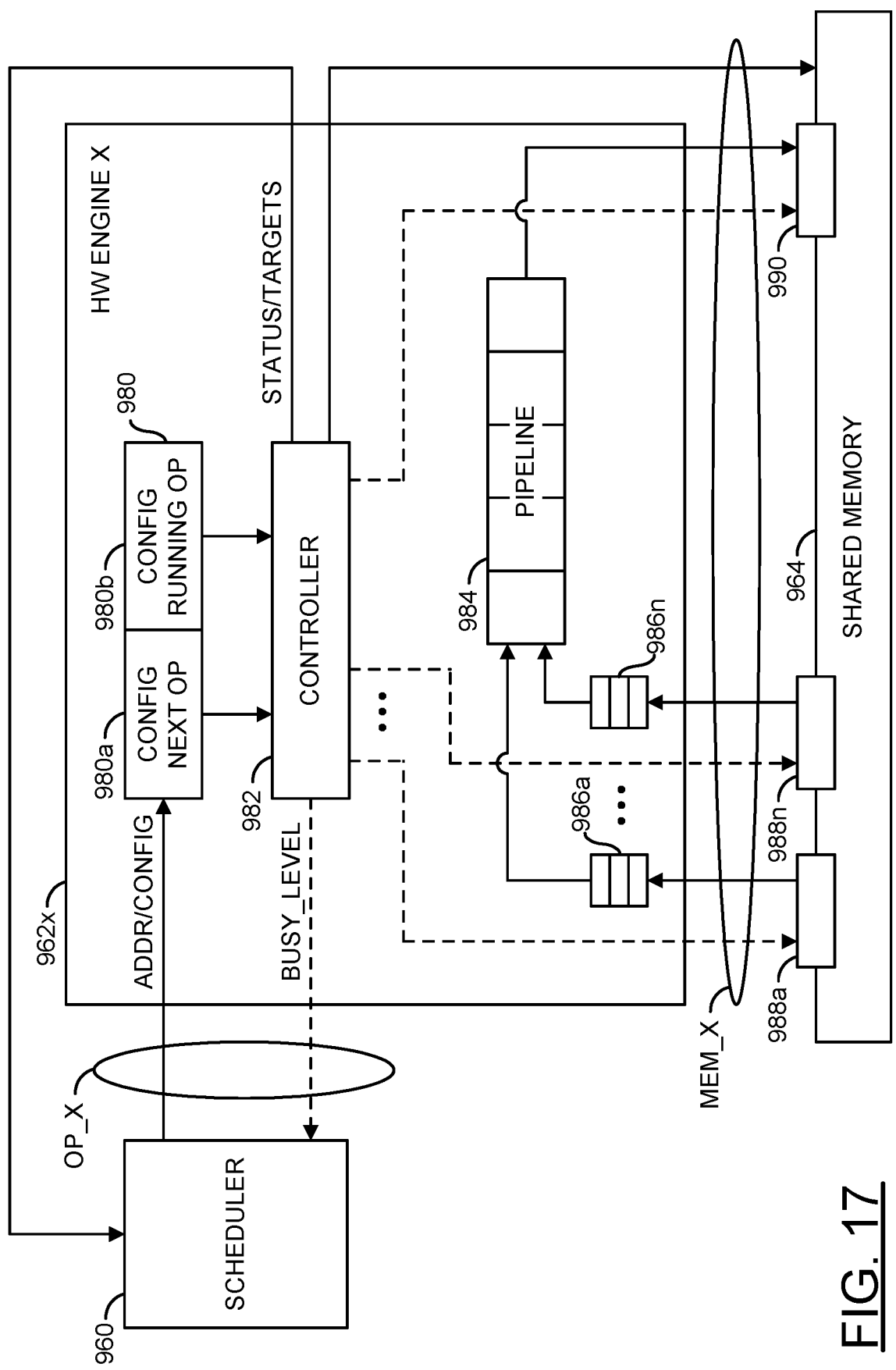
FIG. 17 is a diagram illustrating a generic implementation of a hardware engine of FIG. 16.

Referring to FIG. 17, a diagram illustrating an example implementation of a generic hardware engine 962x of FIG. 16 is shown. The hardware engine 962x may be representative of the hardware engines 962a-962n. The hardware engine 962x generally comprises a block (or circuit) 980, a block (or circuit) 982, a block (or circuit) 984, and a number of blocks (or circuits) 986a-986n. The circuit 980 may be implemented as a pair of memories (or buffers) 980a and 980b. The circuit 982 may implement a controller circuit. In an example, the circuit 982 may include one or more finite state machines (FSMs) configured to control various operators implemented by the hardware engine 962x. The circuit 984 may implement a processing pipeline of the hardware engine 962x. The circuits 986a-986n may implement first-in-first-out (FIFO) memories. The circuits 986a-986n may be configured as input buffers for the processing pipeline 984. The shared memory 964 may be configured (e.g., by signals from the circuit 982) as multiple shared input buffers 988a-988n and one or more output buffers 990.

A signal (e.g., ADDR/CONFIG) may be generated by the scheduler circuit 960 and received by the hardware engine 962x. The signal ADDR/CONFIG may carry address information and configuration data. A signal (e.g., BUSY_LEVEL) may be generated by the circuit 982 and transferred to the scheduler circuit 960. The signal BUSY_LEVEL may convey the busy level of the hardware engine 962x. A signal (e.g., STATUS/TARGETS) may be generated by the circuit 982 and transferred to the scheduler circuit 960. The signal STATUS/TARGETS may provide status information regarding the hardware engine 962x and target information for the operands.

In an example embodiment, the buffers 980a and 980b may be configured as a double-banked configuration buffer. The double-banked buffer may be operational to store configuration information for a currently running operation in one buffer (e.g., the buffer 980b) while configuration information for a next operation is being moved into the other buffer (e.g., the buffer 980a). The scheduler 960 generally loads operator configuration information, including status words in a case where the operator has been partially processed in previous operator chunks, into the double-banked buffer. Once the circuit 982 is finished with the configuration information of the running operation and the configuration information for the next operation has been received, the buffers 980a and 980b may swapped.

The circuit 982 generally implements the control circuitry of the hardware engine 962x. The circuit 982 determines when to switch from the currently running operator to the new operator. The controller 982 is generally operational to control the movement of information into, out of, and internal to the hardware engine 982x. In general, the operation of the hardware engine 962x is pipelined. During an operator switch, a front end of the pipeline 984 may already be working on data for the new operator while a tail-end of the pipeline 984 is still finishing up the processing associated with old operator.

The circuit 984 may implement a pipeline circuit. The pipeline circuit 984 is generally operational to process operands received from the shared memory 964 using functionality designed into the hardware engine 962x. The circuit 984 may communicate data resulting from the functions performed to the one or more shared buffers 990.

The buffers 986a-986n may implement FIFO buffers. The FIFO buffers 986a-986n may be operational to store operands received from the shared buffers 988a-988n for processing in the pipeline 984. In general, the number of FIFO buffers and the number of shared buffers implemented may be varied to meet the design criteria of a particular application.

The functions performed by and structures illustrated in the diagrams of FIGS. 1 to 17 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive images from a capture device; and
a processor configured to (i) extract features from said images, (ii) generate fused disparity maps in response to said features extracted, (iii) generate regenerated images by performing warping on a first subset of said images based on (a) said fused disparity maps and (b) first parameters, (iv) perform a comparison of a sample image to one of said first subset of said images, (v) perform a classification of said sample image based on second parameters and (vi) update said first parameters and said second parameters in response to whether said classification is correct, wherein (a) said classification comprises indicating whether said sample image is one of a second subset of said images or one of said regenerated images and (b) said regenerated images are used as a training dataset.

2. The apparatus according to claim 1, wherein (i) said capture device comprises a first camera and a second camera configured as a stereo camera, (ii) said first subset of said images is captured by said first camera, and (iii) said second subset of said images is captured by said second camera.

3. The apparatus according to claim 2, wherein (i) said first subset of said images comprises left images, (ii) said second subset of said images comprises right images, and (iii) said training dataset comprises data for disparity calculations.

4. The apparatus according to claim 1, wherein (i) said first subset of said images comprises said images captured at an earlier time in a sequence of said images, (ii) said second subset of said images comprises said images captured at a later time in said sequence of said images compared to said first subset of said images and (iii) said training dataset comprises optical flow information.

5. The apparatus according to claim 1, wherein said sample image is randomly selected from said second subset of said images or said regenerated images.

6. The apparatus according to claim 5, wherein (a) said first parameters are updated to adjust said regenerated images to result in a decrease of a probability that said classification of said sample image is correct and (b) said second parameters are updated to increase said probability that said classification of said sample image is correct.

7. The apparatus according to claim 6, wherein said regenerated images are used as said training dataset when said probability is greater than a threshold amount.

8. The apparatus according to claim 7, wherein said threshold amount is approximately 50%.

9. The apparatus according to claim 1, wherein said processor is configured to implement (i) a first neural network to implement a first model based on said first parameters and (ii) a second neural network to implement a second model based on said second parameters.

10. The apparatus according to claim 9, wherein:
said first neural network is configured to (a) extract said features from said first subset of said images and said second subset of said images, (b) generate said fused disparity maps in response to said features extracted, and (c) generate said regenerated images; and
said second neural network is configured to perform (a) said comparison of said sample image to one of said first subset of said images and (b) said classification of said sample image based on said second parameters.

11. The apparatus according to claim 9, wherein (i) said first neural network implements a generative neural network model and (ii) said second neural network implements a discriminative neural network model.

12. The apparatus according to claim 11, wherein said generative neural network model and said discriminative neural network model are configured as an unsupervised generative adversarial network.

13. The apparatus according to claim 11, wherein said processor is configured to operate using said generative neural network model and said discriminative neural network model to generate said training dataset in a training mode of operation.

14. The apparatus according to claim 13, wherein said processor is further configured to operate using said generative neural network model and disable said discriminative neural network model in a data generation mode of operation.

15. The apparatus according to claim 14, wherein said processor operates in said data generation mode of operation after said generative neural network model has been sufficiently trained during said training mode of operation.

* * * * *